Aug. 7, 1923.  
E. E. KRANZ  
MOWING MACHINE ATTACHMENT  
Filed Dec. 9, 1920
1,464,430
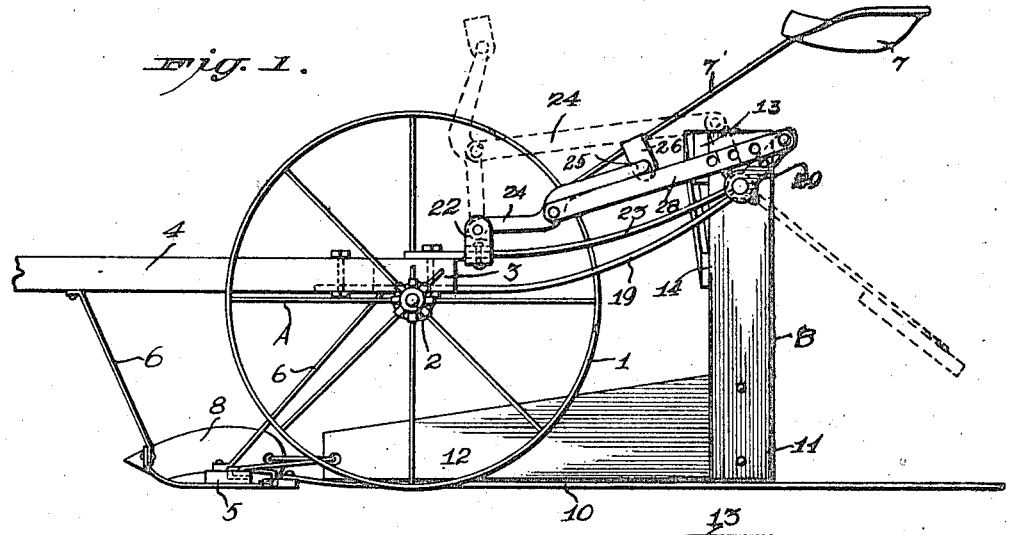
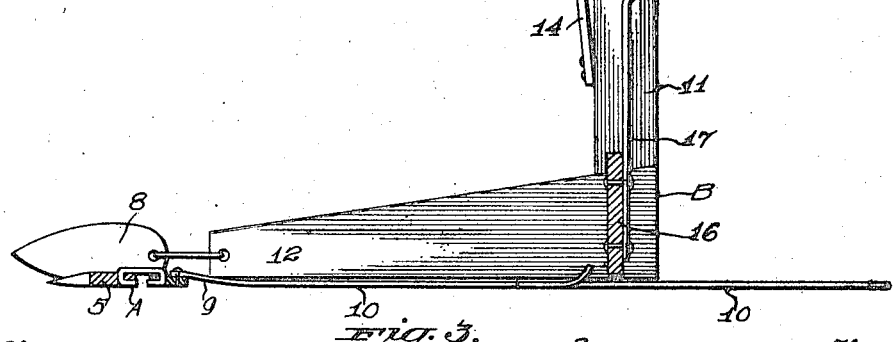
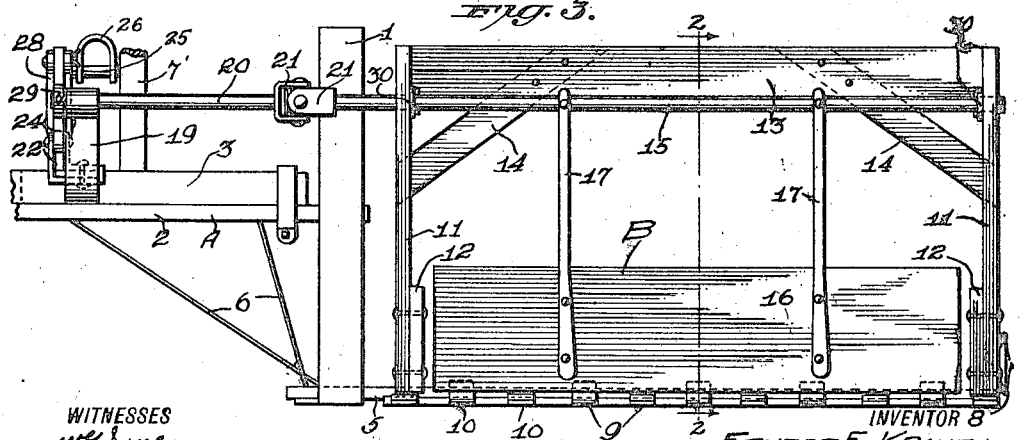
WITNESSES
INVENTOR
ERNEST E. KRANZ
BY
ATTORNEYS Patented Aug. 7, 1923.

1,464,430

UNITED STATES PATENT OFFICE.

ERNEST E. KRANZ, OF KIRLEY, SOUTH DAKOTA.

MOWING-MACHINE ATTACHMENT.

Application filed December 9, 1920. Serial No. 429,504.

*To all whom it may concern:*

Be it known that I, ERNEST E. KRANZ, a citizen of the United States, and a resident of Kirley, in the county of Haakon and State of South Dakota, have invented a new and Improved Mowing-Machine Attachment, of which the following is a full, clear, and exact description.

This invention relates to improvements in mowing machine attachments, particularly to an attachment commonly known as a dropper. It is customary in this art to so construct the dropper and attach it to the mower that the entire dropper must be lifted off the ground to deposit the hay in windrows.

A further object is to provide a novel means of controlling the delivery of hay from the dropper and a means which may be readily operated by the driver of the mower.

Still further objects are to provide a dropping mechanism which is simple and practical in construction, strong and durable in use and suitable for use with various forms of mowing machines now on the market.

With these and other objects in view the invention consists in certain novel features of construction and combinations and arrangements of parts as will be more fully hereinafter described and pointed out in the claim.

In the accompanying drawings—

Figure 1 is a view in side elevation of my improved dropper attached to a mowing machine with parts of one traction wheel broken away for clearness.

Figure 2 is a view in transverse section through the dropper on the line 2—2 of Figure 3.

Figure 3 is a fragmentary view in rear elevation of the device illustrated in Figure 1.

Referring in detail to the drawings A represents a mowing machine and B my improved dropper. The mowing machine A is of a well known type and comprises a pair of traction wheels 1, an axle 2 connecting the wheels and supporting the cross beam 3 to which is rigidly connected a forwardly extending draw beam 4. On one side of the machine a laterally projecting sickle or cutter 5 is supported by suitable straps 6 secured to the draw beam 4 and cross beam 3. No attempt is made to illustrate any particular sickle or cutter but the latter is shown more or less diagrammatically as it is to be understood that the cutter is of any approved form and operated in any desired manner from the mower. Any suitable seat such as 7 for the accommodation of an operator may be supported above and behind the cross beam 3 on an arm 7' as is customary in the art.

The subject matter of this invention resides more particularly in the dropper B which is associated with the mowing machine above described in brief.

At its outer end the cutter bar 5 is provided with the usual shoe 8. A slatted drag frame 9 is provided and consists of a plurality of rearwardly extending fingers 10 having their forward ends fixed to the cutter bar 5 and their rear portions dragging on the ground.

A pair of uprights 11 are secured to the side boards 12 which form the side walls of the dropper. One of these side boards is loosely connected at its forward end to the shoe 8 and the other is secured to the cutter bar adjacent its inner end and in close proximity to the traction wheels 1. A cross piece 13 connects the uprights 11 and diagonal bracing bars 14 connect the uprights and cross piece, strengthening the frame work.

The uprights 11 are bored to provide mounting for a shaft 15. A gate 16 is rigidly secured to the shaft 15 by means of metal straps 17 and normally depends from the shaft, forming the rear wall of the dropper.

The fingers 10 forming the drag frame 9 are alternately long and short, the longer fingers extending rearwardly to a point well behind the gate and the shorter fingers upturned at their free ends for preventing any hay from slipping under the gate, which rests on the longer fingers and limiting the forward swinging movement of the gate.

While I do not wish to be limited to any particular means for operating the shaft 15 to control the gate I have shown one form of operating mechanism which has proven highly satisfactory in use.

A bearing bracket is formed by bending the intermediate portion of a metal strip 19 into looped formation in line with shaft 15. The ends of the strip 19 are located one above and one below the draw bar 4 and are bolted to the same. The strip is located longitudinally of the draw bar and extends rearwardly therefrom.

A short shaft 20 is mounted in said bearing bracket and is flexibly connected by means of a pair of clevises 21 bolted together to the shaft 15. This connection compels the two shafts to turn together but permits a certain amount of flexibility which is highly desirable especially when the machine is operating over uneven ground.

A U-bracket 22 is secured to the upper arm 23 of the strip 19 adjacent its point of connection to the draw beam 4. A lever 24 of the general curvature illustrated is pivotally mounted at one end in the bracket 22. The lever is provided at its upper end with a transversely positioned arm 25. The arm 25 forms the foot rest of a stirrup 26. A link 28 is pivotally connected to the intermediate portion of the lever 24 and to a crank arm 29 on the end of the shaft 20. It will be noted that when the lever 24 is in position to close the gate as shown in full lines in Figure 1, the pivotal point of the lever 24 and link 28 is below a line drawn between the pivotal points of the link 28 and crank arm 29, and the lever 24 and bracket 22. Since the pivotal point of the lever 24 and link 28 is below this dead center line, the gate cannot be opened without first lifting the lever 24, through the medium of the stirrup and then moving it forwardly. The gate is positively locked and under pressure and the gate cannot operate through the medium of the crank arm 29 to move the lever until the pivotal point of the lever and link has been raised above the dead center line referred to.

Thrust collars or other suitable devices 30 may be provided on the shaft 15 to prevent movement of the dropper longitudinally of the shaft.

The operation is as follows: As the mower moves over the ground the hay or other material will fall into the dropper B resting on the slatted drag frame 9 and retained therein by the gate 16 and side boards 12. When a sufficient amount of hay has been collected in the dropper, the operator who sits in the seat 7 with one foot in the stirrup 26 moves the upper end of the lever 24 upwardly and forwardly. This movement of the lever 24, will, through the medium of the link 28, crank arm 29, shaft 20 and clevises 21, turn the shaft 15 and raise the gate 16 upwardly and rearwardly. The parts will then be in the position illustrated in dotted lines in Figure 1. As the frame 9 is dragging over the ground the contact of the stubble with the hay on the frame will serve to remove the same and the lever 24 may be moved back to its normal position to close and positively lock the gate 16.

A dropper constructed in accordance with my invention could be used equally well with animal drawn or motor driven mowers and many other means of operating the gate could be employed. It is apparent, therefore, that various slight changes and alterations might be made in the general form of the parts described without departing from my invention and, hence, I do not wish to limit myself to the precise details set forth but shall consider myself at liberty to make such slight changes and alterations as fairly fall within the spirit and scope of the appended claims.

What I claim is:—

The combination with a mowing machine, of a dropper including a slatted drag frame, side boards riding on the drag frame, uprights secured to the side boards, a shaft mounted in the uprights, a gate secured to the shaft, said drag frame including a plurality of slats, certain of said slats extending under the gate, others of said slats being relatively short, and including upturned rear ends limiting the forward swinging movement of the gate, and means for positively locking the gate against accidental opening, said means including a pedal-actuated controller and a multi-pivoted operative connection between the controller and gate, such pivots being so disposed and arranged as to be located in a dead-center line when the gate is closed to lock the controller to prevent opening of the gate except by way of an upward and forward actuation of said controller, said pedal device of the controller comprising a stirrup to permit the foot of the operator to be used for pulling as well as pushing said controller.

ERNEST E. KRANZ.